(No Model.)
J. OLDHAM.
CIRCULAR SAW FOR CUTTING STEEL.
No. 535,722. Patented Mar. 12, 1895.
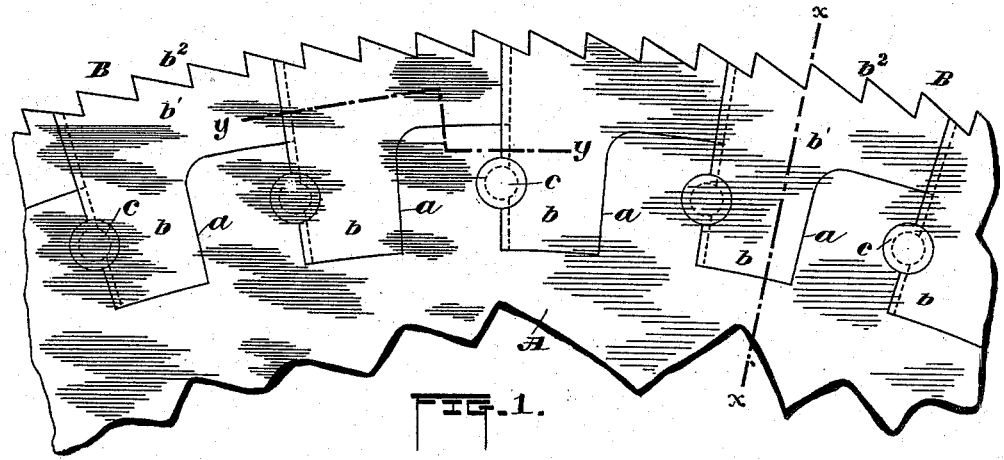
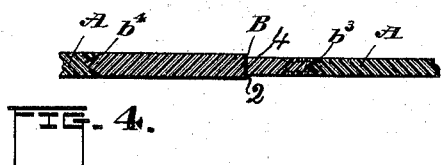
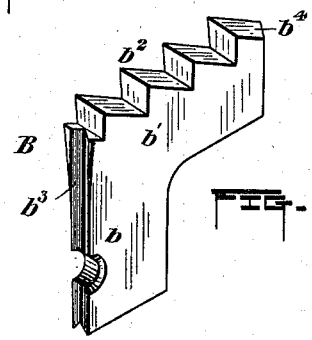
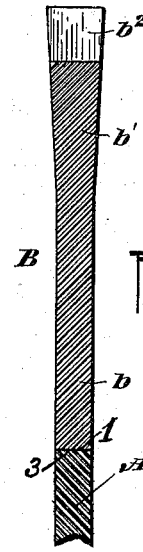
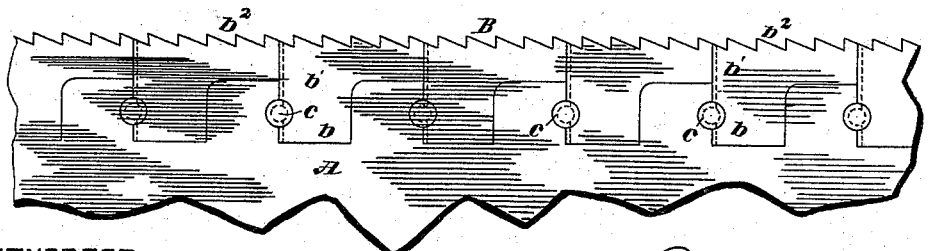
WITNESSES
Frank Blair Rives.
C. Woodville.
INVENTOR
Joshua Oldham
Per J. W. McFister
ATTORNEY

UNITED STATES PATENT OFFICE.

JOSHUA OLDHAM, OF BROOKLYN, NEW YORK.

CIRCULAR SAW FOR CUTTING STEEL.

SPECIFICATION forming part of Letters Patent No. 535,722, dated March 12, 1895.

Application filed October 4, 1894. Serial No. 524,849. (No model.)

*To all whom it may concern:*

Be it known that I, JOSHUA OLDHAM, a citizen of the United States, residing at Brooklyn, in the county of Kings and State of New York, have invented certain new and useful Improvements in Circular Saws for Cutting Steel; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in circular saws more especially for sawing or cutting cold steel, which is also equally applicable to straight saws, the object and nature of which will appear farther on.

Since the introduction of circular saws, known to the trade as milling saws for sawing cold steel, the great obstacles to their more general use have been the difficulty of making the saws hard enough for the intended purpose, and the breaking of the saws during the process of manufacture and while at work. The properties of saw steel do not allow of a sufficiently high temper required for the cutting or sawing of cold steel, except at the extreme points of the teeth, which, when worn, necessitate the re-hardening of the entire blade which, with the chances of its breaking during this operation, together with the deterioration of the steel by repeated annealing and re-hardening, makes its success very uncertain.

Saws of a greater thickness than necessary or desirable have been made with inserted cutters or teeth. The space between the cutting points of such teeth, however, being too wide to allow of quick feed, their work is that of a lathe-tool rather than that of a saw.

Therefore, this invention has for its object the making of a saw by or in which a high tempered tool-steel may be used in the making of the teeth, and regular saw-steel for the body of the blade, or circular plate, proper.

To this end my invention consists of a tooth of an entirely new character, whose details of construction and method of work will be hereinafter more fully disclosed and specifically pointed out in the claim.

In the accompanying drawings:—Figure 1 is a view of a broken away portion of a circular saw, more especially designed for sawing or cutting cold steel, embodying my invention. Fig. 2 is an enlarged vertical section thereof on the line $x-x$ of Fig. 1. Fig. 3 is a detached perspective view of one of the teeth or cutters. Fig. 4 is a section taken on the irregular line $y-y$ of Fig. 1. Fig. 5 is a view showing my invention, as applied to a straight saw, a broken away portion of which, only, is shown.

In carrying out the invention, I produce the disk-portion, proper, A of a circular saw, with the usual notches or slots $a$ indenting its circumference or edge at the proper intervals, for the reception of the inserted teeth or cutters. I employ an inserted tooth or cutter B of peculiar construction, the same having, in addition to the usual inward extension $b$, an arcuate extension $b'$ having its outer or peripheral edge armed with a series or plurality of teeth $b^2$ and adapted to conform to the periphery of the disk A, each tooth or cutter thus forming an approximate right-angle, with the toothed arcuate extension $b'$ filling in the unoccupied interval left between the teeth, or cutters as previously constructed, thus producing a set of teeth of a practically unbroken continuity around the entire circumference of a circular saw or along the edge of a straight saw, in the latter case, the inserted tooth, of course, being a perfect right angle, as seen in Fig. 5.

The inward or downward extension $b$ of the tooth or cutter B is let, or inserted, into the notch $a$ of the disk A and held therein by a rivet $c$ swaged or hammered in place, as well understood.

Each tooth or cutter B has one vertical edge or wall provided with a V-shaped or other form of groove $b^3$ and its other vertical wall or edge provided with a correspondingly shaped ridge or rib $b^4$ thus providing for the seating thereat into each other of the entire, continuous series of cutters or teeth firmly or rigidly interlocking the same into a solid body, greatly aiding their power of resistance against displacement.

Each tooth, it will be observed, is provided with a flat or solid base at the bottom of its vertical portion, as at 1, (Fig. 2) and with a corresponding base for its horizontal portion, as at 2, (Fig. 4) and the plate or blade is provided with a corresponding flat or solid seat in the bottom of each notch or socket, and a similar seat upon the edge-portion of the plate or blade, intermediately of the notches or sockets, as at 3 and 4, (Figs. 2 and 4) respectively. This provides for the seating of the teeth squarely and solidly down upon the plate, and enables both the teeth and plate to retain their full or maximum strength and efficiency, as well as dispenses with a peculiar, or especially constructed, fastening for the retention of the tooth in place, or its connection with the plate or blade, as distinguished from the dovetailing, or tongue-and-groove, cam-and-plate, and splicing method of connecting the tooth to the plate or blade, as heretofore practiced. It will be also seen that, by reason of my particular construction of tooth, the series are caused to brace each other longitudinally, and also themselves to be braced by the shoulders or abutments formed by the intermediate edge-portions of the plate or blade, between the notches or sockets, as will be readily appreciated, and not required to have their horizontal portions sunk into the edge of the plate or blade for the purpose of resisting edge-wise thrust, as has previously been done.

Instead of grinding or concaving the disk A, which is done, as heretofore practiced, for the clearance of the kerf, I flare the teeth or cutters B from a point touching the circle bounding the periphery of the disk A, outward to their outer edges or points for that purpose, thus enabling me to make the disk or blade, proper, of an equal thickness throughout, which allows of its being tensioned and trued with the greatest accuracy.

Additional advantages of my invention are that the teeth or cutters can be replaced, when required, entire, or in sections, and that the blade, proper, being of even thickness, as previously stated, is enabled to stand a greater feed, consequently do more work than circular saws of this class as heretofore constructed. It will be also seen, as before stated, that the teeth or cutters can be made of a high tempered tool-steel, while the body of the blade, or circular plate, proper, can be made of regular saw-steel.

I claim and desire to secure by Letters Patent—

In an insertible-toothed saw, the combination, with the plate or blade having the tooth-receiving notches or sockets, each having a flat bottom or seat and the intermediate edge-portions between said notches or sockets provided, each, with a like seat, of the insertible teeth, each made with two substantially equal right-angle portions, one of which is provided with a series of comparatively small cutting points merging with the cutting points of the next tooth as arranged in order, the lower or inner edges of the said right-angle portions being also produced flat and fitting squarely down upon the aforesaid flat surfaces or seats of the plate or blade, and the rivets or fastenings securing said teeth, at one edge, to said plate or blade against outward displacement, said teeth also interlocking with said plate or blade and each other at their respective adjoining edges, substantially as and for the purpose set forth.

In testimony whereof I affix my signature in presence of two witnesses.

JOSHUA OLDHAM.

Witnesses:
JESSIE WITHELL,
N. THOMAS.